United States Patent Office.

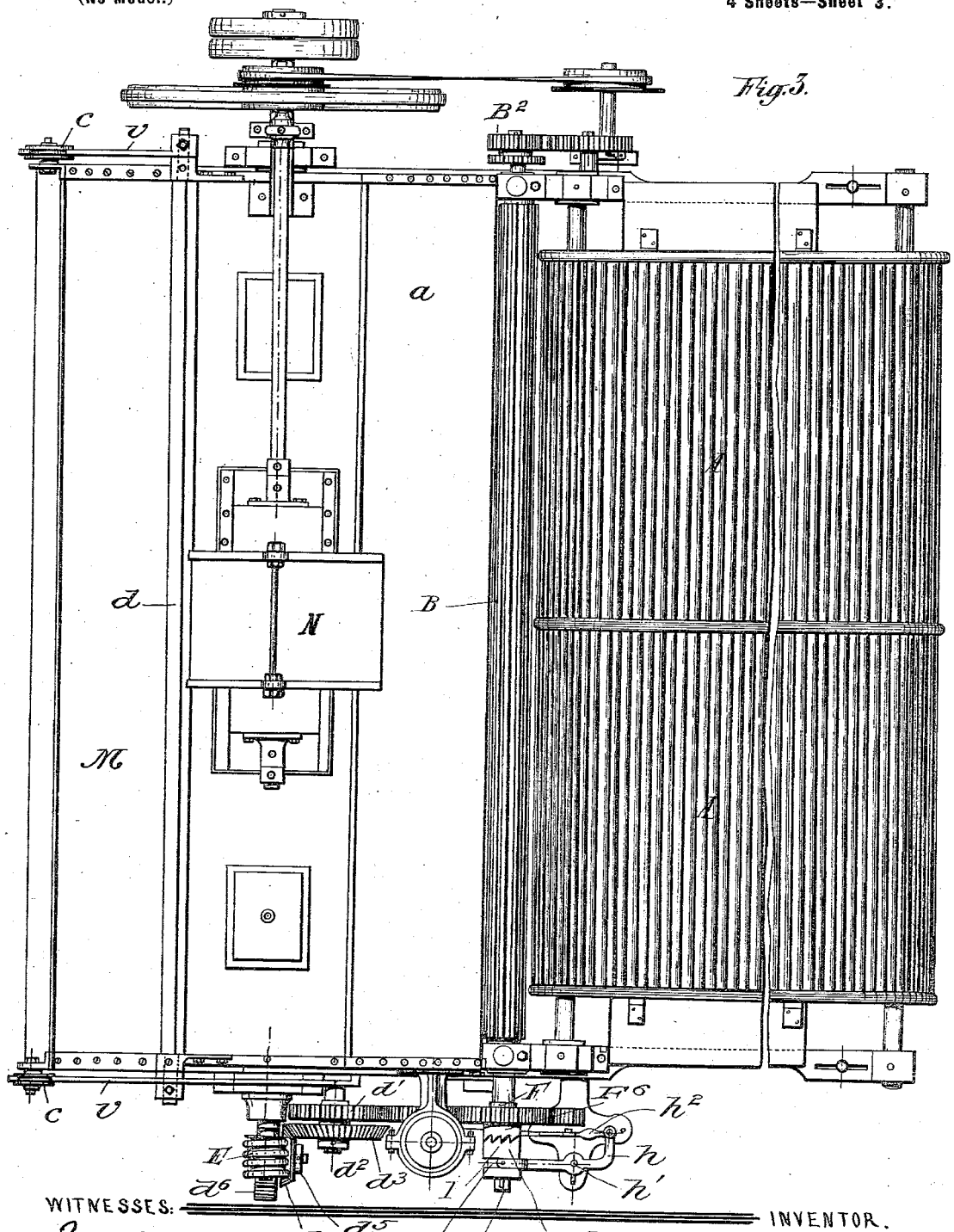

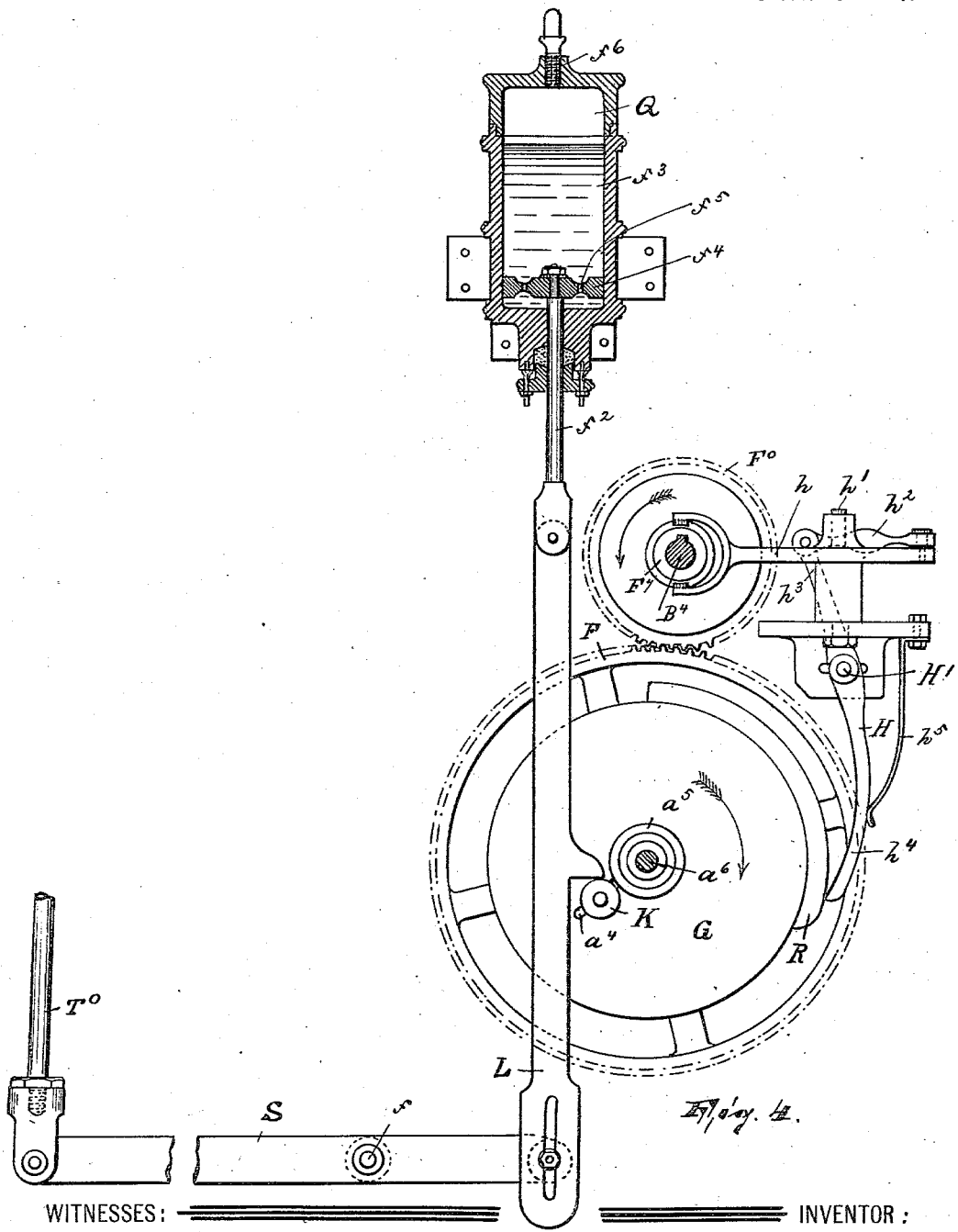

GUSTAVE VERBRUGGEN, OF TAMISE, BELGIUM.

MIXING-MACHINE FOR HAIR, &c.

SPECIFICATION forming part of Letters Patent No. 656,433, dated August 21, 1900.

Application filed November 24, 1899. Serial No. 738,140. (No model.)

*To all whom it may concern:*

Be it known that I, GUSTAVE VERBRUGGEN, manufacturer, a citizen of Belgium, residing at Tamise, in the Kingdom of Belgium, have invented a new and useful Pounding and Mixing Machine for All Kinds of Animal Hairs and Textile Fibers; and I do hereby declare the following to be a full, clear, and exact description of the same.

My present invention relates to improvements in machines for pounding and mixing all kinds of animal hairs and textile fibers; and its object is to provide a machine of such character of simple, strong, and durable construction, reliable and efficient in operation, and by which machine the dust and impurities are removed and withdrawn from the fibrous material and are discharged in a simple and efficient manner.

The invention consists in the improved pounding and mixing machine and in the combination and arrangement of the various parts thereof, substantially as will be hereinafter more fully described, and finally embodied in the clauses of the claims.

Figure 1:
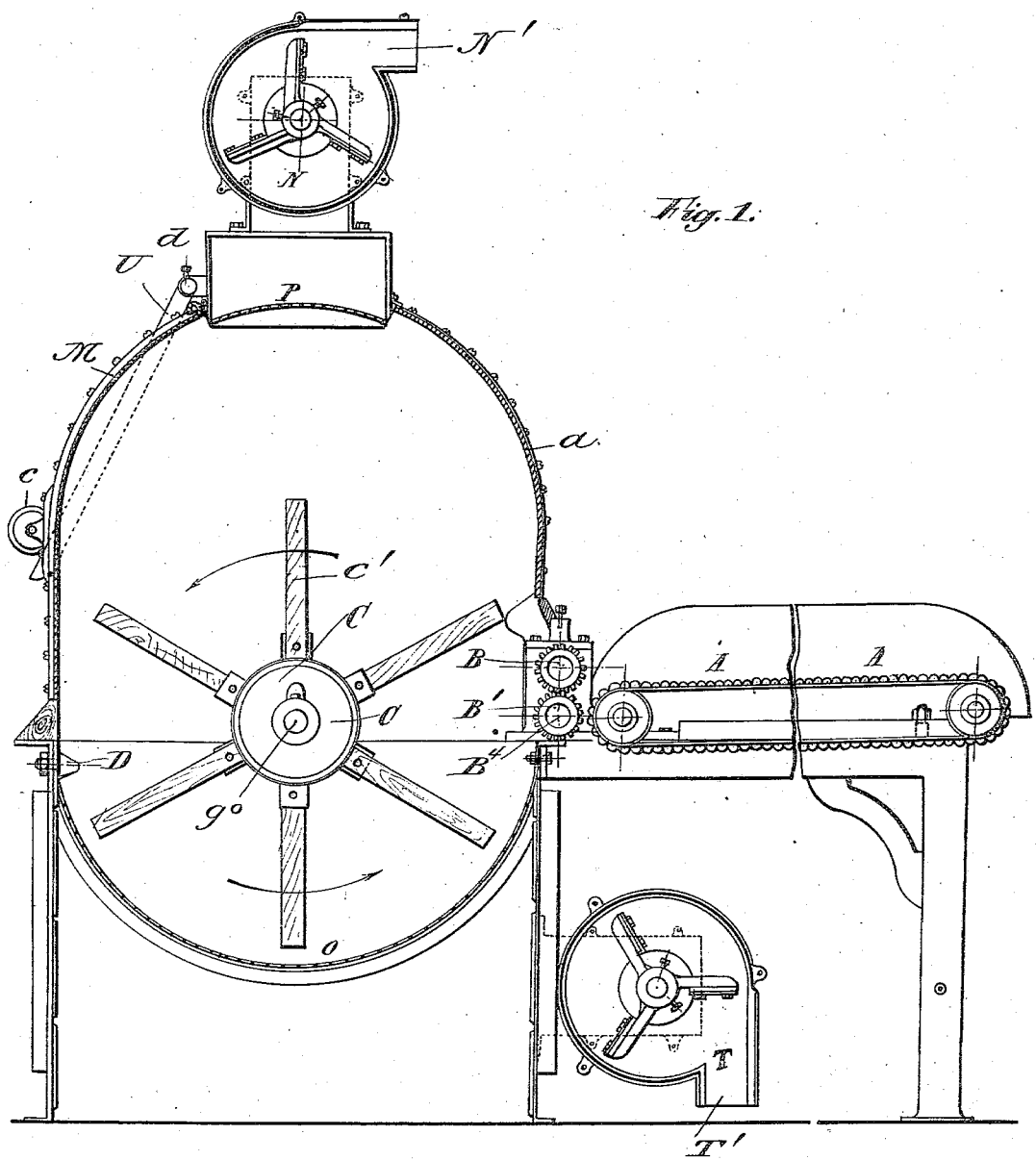
Figure 2:
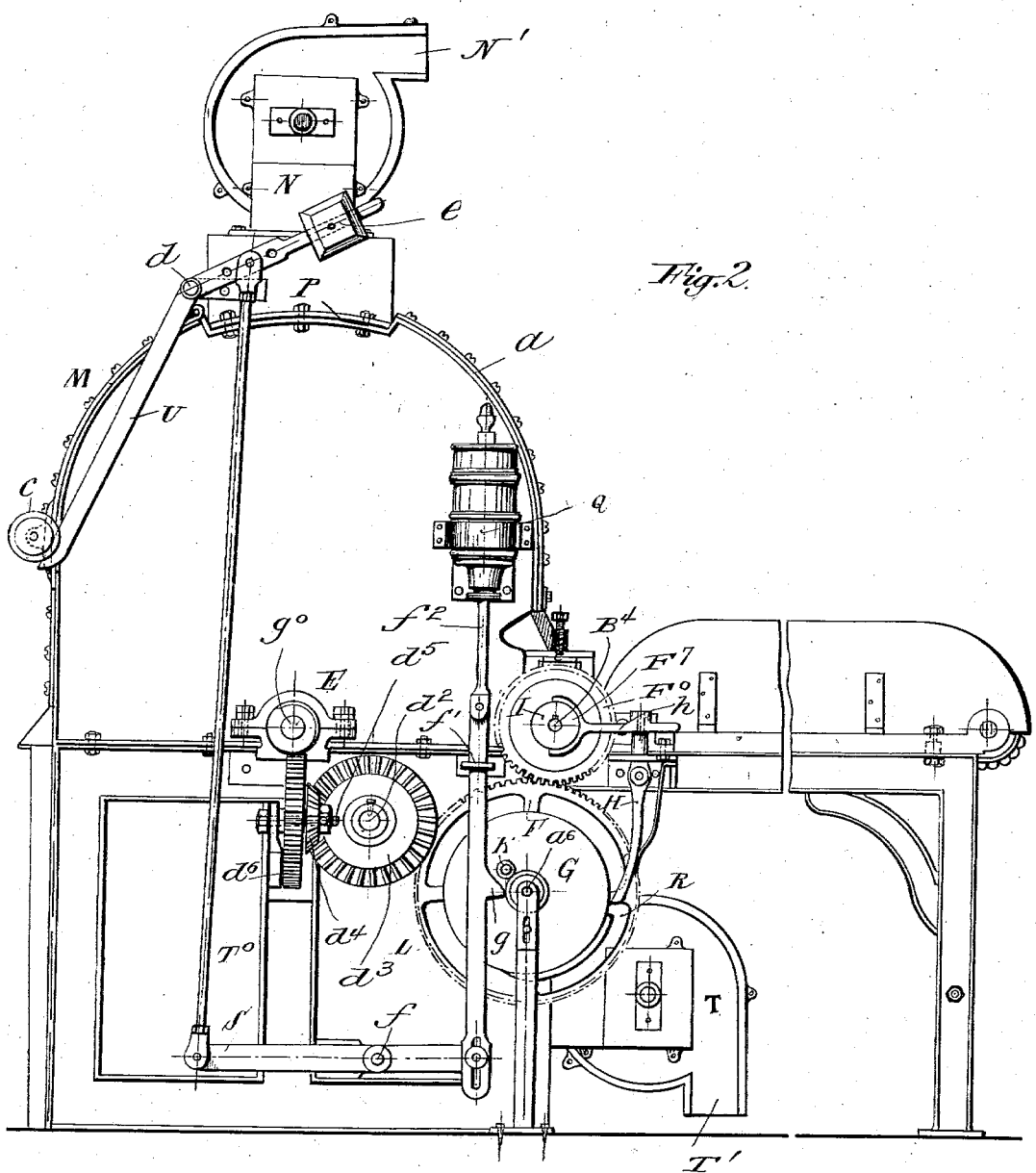

Referring to the accompanying drawings, in which like letters of reference indicate corresponding parts in each of the several figures, Figure 1 is an inside end elevation of my improved machine with certain portions broken away and others removed to better illustrate my invention; Fig. 2, an end elevation proper of the machine and of its driving and operating mechanism. Fig. 3 is a top plan view of Fig. 2; and Fig. 4, an enlarged detail view showing a certain compensating device used in connection with my machine and also illustrating the mechanism for operating said compensating device, as will be hereinafter more fully described.

In said drawings, $a$ represents a casing or receptacle provided in its front upper portion with a hinged lid M, carrying on opposite ends antifriction-rollers $c$ $c$, engaged by arms or levers U, securely mounted on the shaft $d$, as clearly shown in Figs. 2 and 3. On said shaft $d$ is secured one end of a weighted lever $e$, pivotally connected by a rod $T^0$ to one end of a lever S, fulcrumed, as at $f$, to the casing or frame $a$ and having its other end pivotally and adjustably connected to the lower end of a suitably-guided (guided at $f'$, Fig. 2) bar L, the upper end of which is pivotally connected to the piston-rod $f^2$. (See also Fig. 4.) The piston-rod $f^2$ penetrates a suitable stuffing-box of the compensator Q, which consists of an ordinary cylinder $f^3$, in which is slidingly arranged a piston $f^4$ (being carried by the piston-rod $f^2$) and penetrated by a series of vertical openings $f^5$. The cylinder $f^3$ is filled with oil, which can be admitted through inlet $f^6$, as will be manifest. The bar L is provided with a nose or projection $g$, adapted to be engaged by an antifriction-roller K, mounted on an arm $a^4$, secured to and projecting from a collar $a^5$, integral with the disk G. The latter is secured on a suitable stub-shaft $a^6$, carrying a gear-wheel F. Said gear-wheel F meshes with the gear-wheel $d'$, Fig. 3, mounted on the stub-shaft $d^2$, which latter also carries a beveled pinion $d^3$ in mesh with the beveled pinion $d^4$, mounted on a shaft $d^5$, the latter also carrying a gear-wheel $d^6$, receiving its motion from a worm E, secured on the main driving-shaft $g^0$. On the shaft $g^0$ are secured a series of disks C, from which project radially arms or strikers C', as clearly shown in Fig. 1 of the drawings.

To the rear portion of the machine and substantially in horizontal alinement with the main driving-shaft $g^0$ are revolubly mounted two corrugated rollers B B', suitably connected with each other by gear-wheels B² on the opposite end of the machine and adapted to receive the animal hair or textile fibers, which are fed between said rollers from an endless feed-table A. As said feed-table is of ordinary construction, further description of the same is deemed unnecessary.

On the shaft B⁴ of the lower feed roller B' is loosely mounted a gear-wheel F⁰, meshing with the gear-wheel F and provided with a notched sleeve F⁶ in engagement with a correspondingly-notched sleeve or collar F⁷, securely but slidingly mounted on said shaft B⁴ and provided with an annular groove F⁸, engaged by a forked lever $h$, fulcrumed as at $h'$, Figs. 2, 3, and 4, and having its outer or free end pivotally connected by a link $h^2$ with the shorter arm $h^3$ of a lever H, fulcrumed as at H'. The longer arm $h^4$ of said lever H is adapted to be raised or operated by a cam R, projecting from the outer periphery of the disk G. A flat spring $h^5$ bears with its free end on the longer arm $h^4$ of the lever H for the purpose of returning said lever to its normal position after being disengaged by the cam R, as will be hereinafter described.

To the lower rear portion of the casing or receptacle a is secured a blower T of ordinary construction, which is adapted to suck the debris, dust, or impurities through the curved plate O, disposed in the lower portion of the receptacle and to discharge it through its outlet T'. A second blower N is arranged on the top portion of the casing a and in a like manner is adapted to suck impurities, dust, and debris through the perforated plate P and to discharge the same through its outlet N'. It may be well to remark that power is supplied to the blowers from the main driving-shaft in any suitable manner. Within the casing and in close proximity to the strikers or arms C' are arranged a series of pointed projections or scrapers D for a purpose hereinafter stated.

The animal hair or fibrous material to be mixed and pounded is placed upon the endless revolving feed-table A and is fed between the corrugated feed-rollers B and B'. The material entering the casing a is taken by the revolving strikers or arms C', and is thus loosened and mixed, as will be manifest. The material when reaching the pointed projections D' is again loosened and mixed in a manner well known to those familiar in the art.

A certain amount of material is thus loosened and mixed within the receptacle a while the gear-wheel F is making one revolution. As soon as the antifriction-roller K engages the nose or projection g of the arm or bar L the latter is raised, and through the fulcrumed lever S and the rod $T^0$ swings the lever e downward and partly rotates the shaft d. As before mentioned, the arms or levers V are securely mounted on said shaft d and by the partial rotation of the latter are accordingly raised and through their engagement with the antifriction-rollers c open the lid M, allowing the pounded and mixed material to be thrown out by the revolving strikers or arms C' or to be removed by hand, if so desired, as will be manifest. At the time when the antifriction-roller K is about to engage the nose or projection g on the sliding bar L the longer arm $h^4$ of the lever h is engaged by the cam R and is swung on its fulcrum II', and through its link connection $h^2$ operates the forked lever h, sliding the corrugated sleeve $F^7$ out of engagement with the sleeve $F^6$ of the gear-wheel $F^0$, thereby stopping the rotation of the shaft $B^4$ and of the feed-rollers B and B', as will be manifest. Meanwhile (while the pounded and mixed material is discharged through the opened lid) the antifriction-roller K has cleared the nose or projection g on the sliding bar L, and the latter will gradually descend by its own weight and also by the weight of the lid M; but it will be understood that its descent is regulated—that is to say, said lever can descend only gradually on account of the piston $f^4$ having to overcome the volume of oil in the compensator Q. Said oil while the piston is moving downward flows from the lower portion of the cylinder $f^3$, through the perforations $f^5$ in the piston $f^4$, into the upper portion of said cylinder.

Having thus described my invention, what I claim as new, and desire to secure by Letters Patent, is—

1. The combination, with a casing and with a drive-shaft journaled therein, of a series of radial arms or strikers carried by the shaft within said casing, a revoluble disk, said disk having projections, the one on its periphery and the other on one of its faces, gearing connecting said shaft and the disk, revoluble feed-rollers journaled in operative proximity to said arms or strikers, a shaft carrying one of said rollers, a hinged door for said casing, a system of levers controlling said door and adapted to be engaged by said last-named projection to actuate said door, a compensating mechanism for said system of levers, gearing between said disk and said last-named shaft, one of the members thereof being loosely mounted on said shaft, a clutch mechanism adapted to connect said loose member of the gearing and said roller-carrying shaft, a fulcrumed fork connected to the movable member of said clutch mechanism, a suitably-fulcrumed lever adapted to be engaged at one of its ends by the peripheral projection of said disk, and a link connecting the other end of said lever and the fork, substantially as described.

2. The combination with the casing and with the main driving-shaft penetrating the same, of a series of radially-arranged strikers or arms in said casing and carried by said shaft, corrugated feed-rollers in close proximity to said arms or strikers, and a gear-wheel loosely mounted on the shaft of one of the feed-rollers, a clutch mechanism also mounted on said last-mentioned shaft and adapted to unlock and lock said gear-wheel to its supporting-shaft, a second gear-wheel in mesh with the first-mentioned gear-wheel, a shaft supporting said second gear-wheel, a disk mounted on said last-mentioned shaft and provided with a cam, means controlled by said cam for operating the clutch mechanism, a train of gears transmitting motion from the main driving-shaft to the second-mentioned gear, a hinged lid arranged on the casing, means controlled by the second-mentioned gear for automatically opening said lid while the clutch is being operated to stop the rotation of the feed-rollers, and a compensator for controlling the closing of said lid, all said parts substantially as and for the purposes described.

In testimony whereof I have signed this specification in the presence of two subscribing witnesses.

GUSTAVE VERBRUGGEN.

Witnesses:
CHARLES HONORE,
P. POHLMY.